United States Patent [19]

Jenkins et al.

[11] 3,724,472
[45] Apr. 3, 1973

[54] SPRAY-WASHING APPARATUS FOR VEHICLES

[76] Inventors: Tobie W. Jenkins, 3330 Ash St.;
Delbert G. Jenkins, 3303 Ash St.;
Dennis L., Jenkins, 3015 Ash St., all of Denver, Colo. 80207

[22] Filed: May 3, 1971

[21] Appl. No.: 139,717

[52] U.S. Cl. .....................134/93, 134/123, 137/357
[51] Int. Cl. ..............................................B60s 3/04
[58] Field of Search ...134/45, 93, 100, 123; 137/357

[56] References Cited

UNITED STATES PATENTS 3,368,571   2/1968   Honorof..............................134/100
2,673,762   3/1954   Doyle, Jr. ..........................134/93 X
3,139,096   6/1964   Harris.................................134/100
3,578,001   5/1971   Attaway..............................134/45

FOREIGN PATENTS OR APPLICATIONS 241,569   8/1960   Australia.............................134/123

Primary Examiner—Robert L. Bleutge
Attorney—Richard D. Law

[57] ABSTRACT

A pipe frame having spray nozzles mounted therealong is pivotally attached at garage doorway to selectively spray-wash an automobile driving in or out of garage. Water supply to the frame may be from house supply, and mechanism is provided to mix soap with the water supply.

2 Claims, 3 Drawing Figures

PATENTED APR 3 1973

3,724,472

INVENTORS
TOBIE W. JENKINS
DELBERT G. JENKINS
DENNIS L. JENKINS

BY
Richard D. Law
ATTORNEY

SPRAY-WASHING APPARATUS FOR VEHICLES

The present invention relates to spray apparatus mountable at private garage doorways for washing automobiles. An automobile to be washed is driven back-and-forth a few times under the spray from the apparatus. The spray concurrently covers both sides and the top of the automobile. Means may be provided for remote actuation of the spray. Water, soap-and-water, or wax may be sprayed from the apparatus, and means may be provided to selectively switch from one type of spray to another. The apparatus may be hinge mounted at the garage doorway so as to be swung into a stowed position in the garage when not in use.

Accordingly, an object and advantage of the present invention is to provide apparatus for spray-washing vehicles such as automobiles. Another object of the invention is to provide a spray-washing device easily mountable at garage door-ways. Yet another object of the invention is to provide a spray apparatus which may be remotely controlled by a driver in an automobile while the automobile is being spray-washed. A further object of the invention is to provide spray apparatus which may be selectively controlled to spray different substances. A still further object and advantage of the invention is to provide spray apparatus mountable at a garage doorway to be swung into position to spray-wash an automobile entering or leaving the garage, the apparatus being stowable in the garage without dismounting.

These and other objects and advantages of the present invention may be readily ascertained by referring to the following description and appended illustrations, in which.

Figure 1:
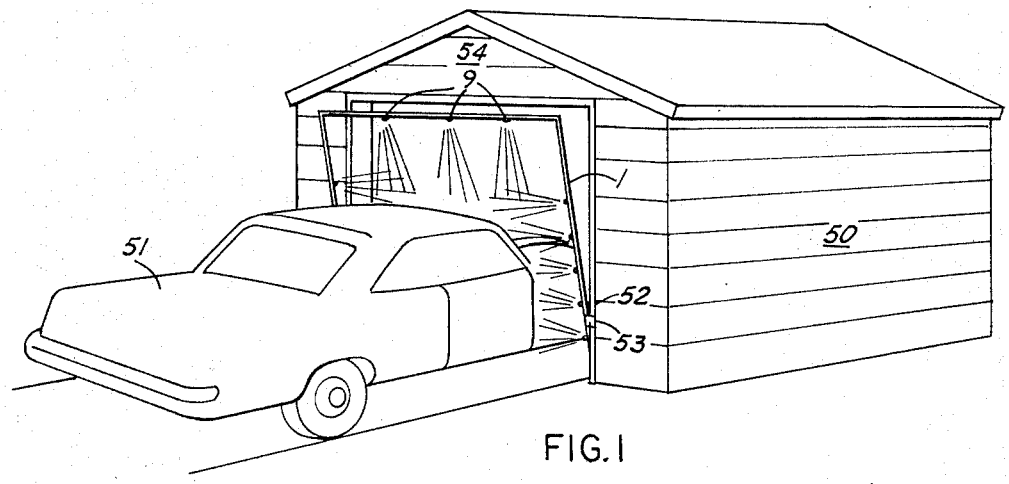
FIG. 1 is a perspective view of one embodiment of the apparatus of the invention as utilized.
Figure 2:
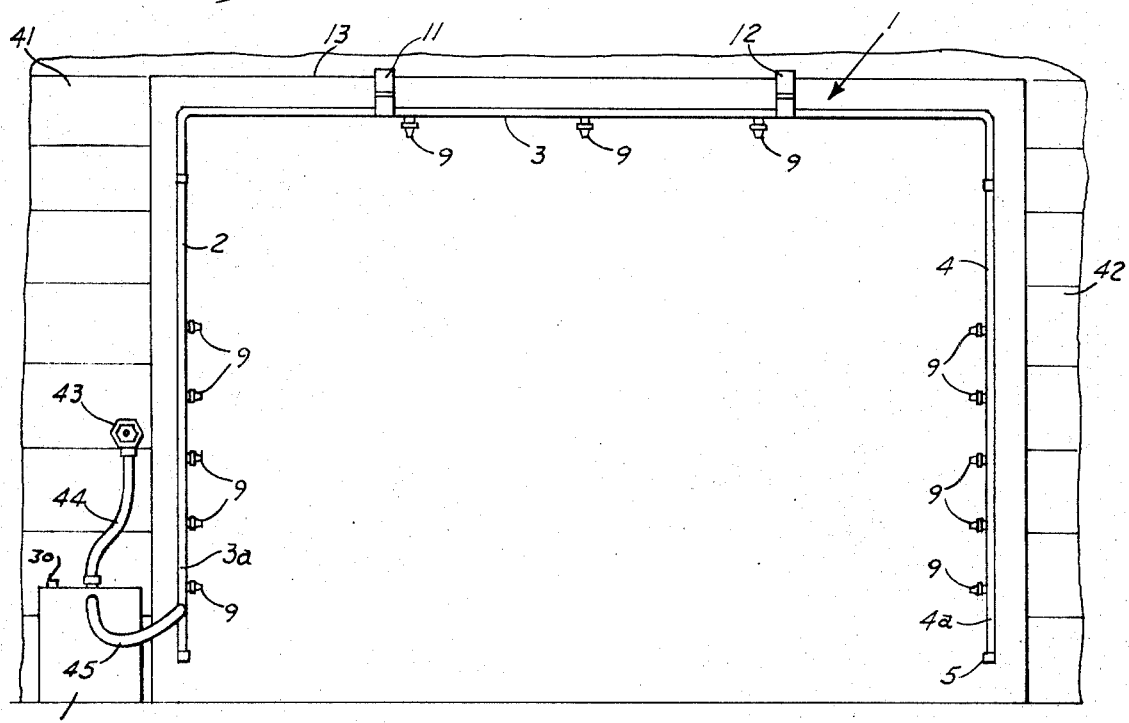
FIG. 2 is a front view of the apparatus of the invention.

Referring to FIG. 1, a pipe frame, indicated in general by numeral 1, has a generally inverted U-shape; the dimensions of frame 1 are such that an automobile of ordinary size may be driven under the frame when the frame is in canted or erected position (FIG. 1). As shown in FIG. 2, frame 1 is fabricated from three connected sections of pipe or tubing 2, 3, 4. End 4a of pipe 4 is capped with cap 5, while end 3a of pipe 3 is connected to a pressurized water supply, i.e., garden hose or the like. The pipes 2, 3, 4 may be ordinary iron water pipes and the connections made by conventional threaded elbows, or they may be made of copper or aluminum tubing with soldered joints. Spray nozzles 9 are mounted (e.g., threaded) into the pipes at predetermined positions. The nozzles may be conventional nozzles which eject a fairly well-spread water spray. The nozzles face inwardly into the area encompassed by the frame 1 and generally directed outwardly from the garage. It has been found that a spacing arrangement as illustrated effectively spray-washes an automobile. The water supply to the pipes of the frame 1 may merely be a garden hose 45 run from house water pressure. The hose is easily coupled to pipe 3 by conventional couplings. Detergent may be used as explained below.

The frame 1 may be secured at a garage doorway numerous ways depending upon, for example, the type of garage door. When the garage has an overhead or rolling door, the frame may be pivotally supported at hinges 11 and 12 from lintel 13 across the garage door opening. When mounted in this manner, the frame 1 may be pivoted upwardly and secured in horizontal position at the top of the doorway when not in use. Such an arrangement is particularly convenient for double garages. The frame may be pivotally secured near both ends of the frame legs to the door jambs on a single garage (FIG. 1). When attached in the latter manner, the frame is swung against the garage face when not in use, but, in use, may be swung out from the garage to utilize the full range of spray. Less water enters the garage with this latter type of mounting. Alternatively, only one leg of the frame 1 may be pivotally mounted at one door jamb so that the frame may be swung inwardly against the garage side wall for storage. Pivotal mounting hardware is well known and may be welded or otherwise fixed to frame 1. The frame may be secured to the garage door and the legs pivoted up against the door when not in use. A valve 43 mounted in water supply line 44 for selectively controlling the supply of water to the frame may be placed in the garage so that the automobile driver need merely reach out the automobile window to turn the spray on or off. Such control valves 43 are well known.

Figure 3:
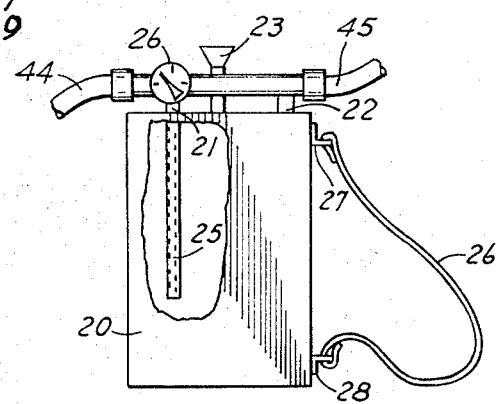
FIG. 3 is a detail, partially in section, of further apparatus according to the invention.

The control valve 43 may be combined with a mechanism to combine soap or wax with the water supply to frame 1. One such a mechanism is shown in FIG. 3. In the illustrated embodiment, the mechanism includes a detergent container 20 having a water inlet 21 and a water outlet 22 and a closeable detergent supply inlet 23. Container 20 may have a wise variety of forms, and the inlet 21 and outlet 22 may be formed in a removable cap or the cap may be permanently fixed to the container. A perforated tube 25 may communicate with inlet 21 and extend well into container 20. Water flowing into container 20 through tube 25 will be well mixed with detergent in the container so that the discharge out of outlet 22 into the frame 1 will be detergent bearing water. A three-way valve 26 may cooperate with the water inlet 21 and outlet 22 on container 20. In the off position, no water would be supplied to frame 1; in another position, the water supply could be mixed with detergent to supply frame 1; and the third position could divert water directly from the inlet to the outlet to supply clear or rinse water to frame 1. Soap, detergent, or other water-soluble cleaning agents may be utilized in container 20. Certain soluble or emulsified waxes may, also, be utilized in the container.

In one form a carrying strap 26 secured through flanges 27 and 28 on container 20 may be utilized to conveniently carry the container. With hose 45 disconnected from frame 1, and the water supply on, spray from hose 45 may be utilized for other spray applications. As shown in FIG. 2, a simple container 29 having an inlet connected hose 44 and an outlet connected to hose 45. Filling inlet 30 for detergent permits adding the detergent.

The unit may be made of steel, copper or aluminum pipe in the metal type, and may be made of various types of plastic pipe available on the market. The plastic pipe may be threaded or cemented together, using necessary connections. Plastic nozzles may, also, be used with the unit, and these may be threaded, cemented or cast into the pipe. When plastic pipe is used, it may be attached permanently to the outside or built in the frame with the nozzles extended outwardly in washing condition.

By using adjustable nozzles on the sides and the top, it is possible to adjust to the contour of the vehicle being washed. This permits direct washing of the front and rear of different makes of automobiles. This adjustment uses less water and lower pressures.

As in FIG. 1, an automobile 51 may be driven in and out of a garage 5 upon which frame 1 has been mounted on door jamb 52. As shown, frame 1 is mounted by hinge 53 on jamb 52 and, in use, is tilted away from face 54 of garage 50 to spray automobile 51. The detergent spray washes the car being driven in and out of the garage. When the detergent is used up, clear water rinses the car during the in and out driving.

We claim:

1. Apparatus for mounting at garage doorways to wash automobiles and like vehicles comprising: at least one set of water pipes forming a generally inverted U-shaped frame having two legs and having a width and height to accomodate an automobile therethrough; hinged mounting means for pivotally attaching said frame at a garage doorway for pivoting said frame out of the doorway when not in use;

a plurality of spray nozzles spacedly mounted on said pipes of said frame for directing a plurality of sprays of water into the area encompassed by said frame and said nozzles being directed outwardly away from said garage; detergent supply means; water supply line means extending from a supply of water to said frame; communicating line means from said water supply line means into said detergent supply means and outlet means from said detergent supply means into said water supply line means downstream from said communicating line means; control said water supply line means including a three way control valve for closing said water supply line means, for directing water into said detergent supply means and for directing only water from the water supply to said frame; and means for pivoting said frame at an angle from the face of the garage door opening.

2. Apparatus according to claim 1 wherein said hinged mounting includes hinges mounted on at least one of the legs of said frame for mounting on a jamb at a garage doorway.

* * * * *